United States Patent
Lee et al.

(10) Patent No.: US 10,474,947 B2
(45) Date of Patent: Nov. 12, 2019

(54) CONTROL METHOD, ELECTRONIC DEVICE AND NON-TRANSITORY COMPUTER READABLE STORAGE MEDIUM

(71) Applicant: ASUSTeK COMPUTER INC., Taipei (TW)

(72) Inventors: Wei-Long Lee, Taipei (TW); Mei-Chieh Ku, Taipei (TW); Tzu-Yu Kung, Taipei (TW); Chung-Yi Wu, Taipei (TW); Tai-Yin Lin, Taipei (TW); Jia-Wei Chou, Taipei (TW); Chao-Yang Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 232 days.

(21) Appl. No.: 15/600,802

(22) Filed: May 22, 2017

(65) Prior Publication Data
US 2017/0344875 A1 Nov. 30, 2017

Related U.S. Application Data

(60) Provisional application No. 62/341,764, filed on May 26, 2016.

(30) Foreign Application Priority Data

May 2, 2017 (CN) .......................... 2017 1 0300953

(51) Int. Cl.
*B25J 19/02* (2006.01)
*G06N 3/00* (2006.01)
(Continued)

(52) U.S. Cl.
CPC .............. *G06N 3/008* (2013.01); *G10L 15/08* (2013.01); *G10L 25/48* (2013.01)

(58) Field of Classification Search
CPC ..................... G06F 21/31; G06F 3/167; G05B 2219/33051; G05B 2219/35444;
(Continued)

(56) References Cited

U.S. PATENT DOCUMENTS 6,773,344 B1 * 8/2004 Gabai ...................... A63H 3/28
463/1
8,644,990 B2 * 2/2014 Kim ........................ B25J 9/1656
318/568.12
(Continued)

FOREIGN PATENT DOCUMENTS

CN 103428536 A 12/2013
CN 105425970 A 3/2016

*Primary Examiner* — Dalena Tran
(74) *Attorney, Agent, or Firm* — CKC & Partners Co., LLC (57) ABSTRACT

An electronic device is provided. The electronic device comprises: a storage for storing interaction setting information and behavior setting information; an interaction interface; and a processor electrically connected to the storage and the interaction interface. When the processor receives a behavior-driving command from the interaction interface, the processor is configured to select the behavior setting information and the interaction setting information according to the behavior-driving command. The processor is configured to perform a behavior according to the behavior setting information. The processor is further configured to perform an interaction operation based on the behavior according to the behavior setting information and the interaction setting information when the behavior is had. A control method and a non-transitory computer readable storage medium are also provided.

22 Claims, 5 Drawing Sheets

(51) Int. Cl.
*G10L 15/08* (2006.01)
*G10L 25/48* (2013.01)

(58) Field of Classification Search
CPC .......... G06Q 10/0631; G06Q 30/0261; G06Q 30/0269; A63H 2200/00; B25J 13/00; B25J 13/081; B25J 9/1656; B25J 9/1671
USPC ....... 700/245, 264, 258, 259; 901/10, 30, 47
See application file for complete search history.

(56) References Cited

U.S. PATENT DOCUMENTS

| | | | |
|---|---|---|---|
| 2003/0004611 A1* | 1/2003 | McKinney, Jr. | G06N 3/008 700/258 |
| 2009/0006295 A1* | 1/2009 | Angell | G06K 9/00335 706/21 |
| 2011/0175810 A1 | 7/2011 | Markovic et al. | |

* cited by examiner

CONTROL METHOD, ELECTRONIC DEVICE AND NON-TRANSITORY COMPUTER READABLE STORAGE MEDIUM

CROSS-REFERENCE TO RELATED APPLICATION

This application claims the priority benefit of U.S. provisional application Ser. No. 62/341,764, filed on May 26, 2016 and China application serial No. 201710300953.3, fined on May 2, 2017. The entirety of the above-mentioned patents application are hereby incorporated by references herein and made a part of specification.

BACKGROUND OF THE INVENTION

Field of the Invention

The disclosure relates to a control method, an electronic device and a non-transitory computer readable storage medium.

Description of the Related Art

With the development of society, life goes in fast-paced. To enhance more learning experience, and considering the economic, security and varies requests at home, a household robot is developed. Varies requests including health care or day care services, for companionship, or an education service are developed to meet the growing demand. The household robot that aims to improve the convenience and supports at home is in need.

BRIEF SUMMARY OF THE INVENTION

According to a first aspect of the disclosure, an electronic device is provided. The electronic device comprises a storage, an interaction interface and a processor. The storage is configured to store interaction setting information and behavior setting information. The processor is electrically connected to the storage and the interaction interface. When the processor receives a behavior-driving command from the interaction interface, the processor is configured to select the behavior setting information and the interaction setting information according to the behavior-driving command. The processor is configured to perform a behavior according to the behavior setting information. The processor is further configured to perform an interaction operation corresponding to the behavior based on the behavior setting information and the interaction setting information when the behavior is had.

According to a second aspect of the disclosure, a control method is provided. The control method is applied to an electronic device. The control method comprises: receiving a behavior-driving command; selecting behavior setting information and interaction setting information according to the behavior-driving command; performing a behavior according to the behavior setting information; and performing an interaction operation corresponding to the behavior based on the interaction setting information and the behavior setting information when the behavior is had.

According to a third aspect of the disclosure, a non-transitory computer readable storage medium for storing a program command is provided. After the program command is loaded on the electronic device, the electronic device performs steps of: receiving a behavior setting information; selecting behavior setting information and interaction setting information according to the behavior-driving command; performing a behavior according to the behavior setting information; and performing an interaction operation corresponding to the behavior based on the interaction setting information and the behavior setting information when the behavior is had.

In embodiments, when the behavior is had by the electronic device, the processor is configured to control the electronic device to perform the interaction operation corresponding to the behavior according to various types of the interaction setting information and the behavior setting information. Thus, the representations of the storytelling and the teaching are diversified, which enhance the interest and the learning effect.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. Conventionally, the drawings are shown only for illustration, in which the components are not represented in their actual size. For better understanding, the sizes of various components can be enlarged or reduced. Same or similar components described hereinafter are denoted by the same or similar reference symbol.

Figure 1:
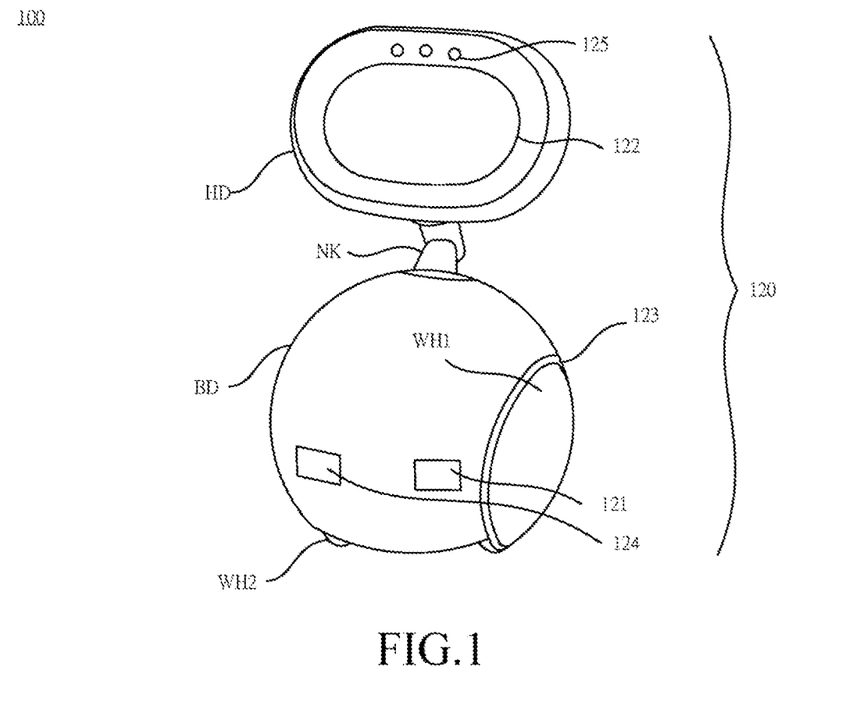
FIG. 1 is a schematic diagram showing an appearance of an electronic device in an embodiment.
Figure 2:
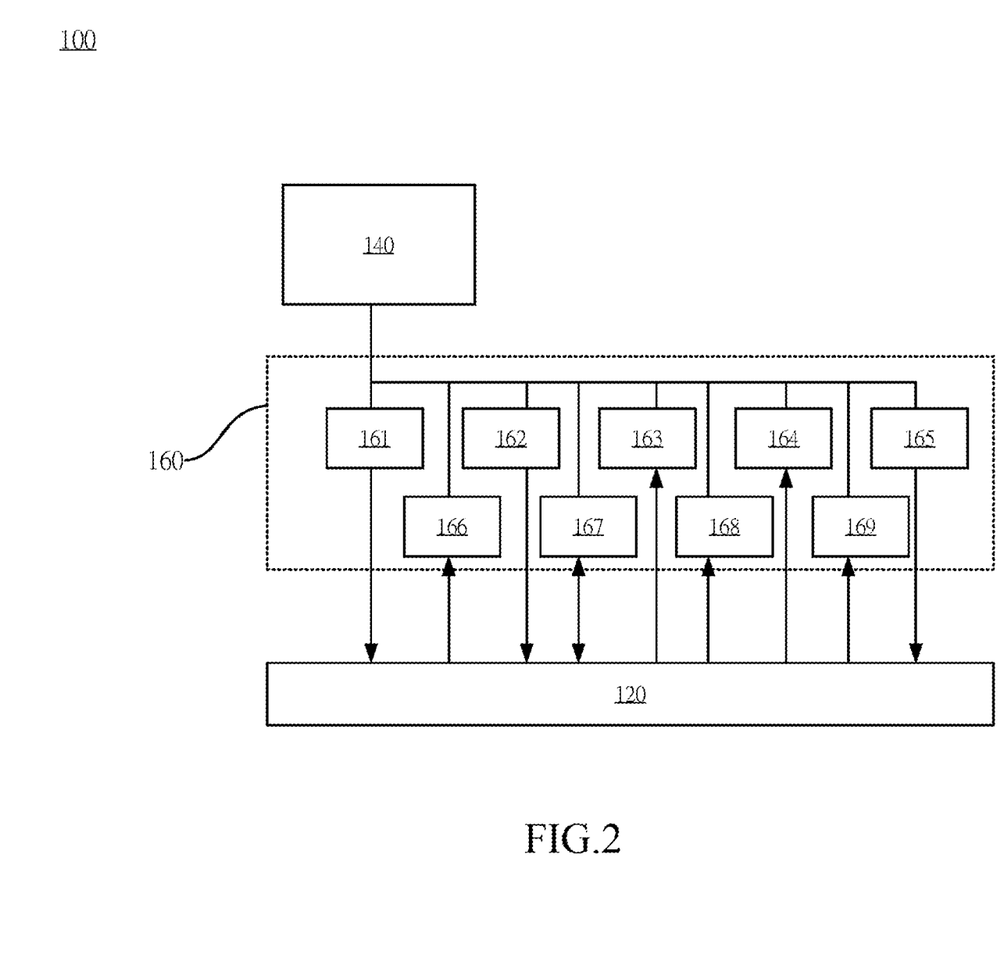
FIG. 2 is a schematic diagram showing a circuit of an electronic device in an embodiment.

Please refer to FIG. 1 and FIG. 2. In an embodiment, as shown in FIG. 1, an electronic device 100 is a robot that provides home services, such as, child education assistance and care services. In an embodiment, the electronic device 100 is an electronic device with interaction functions. Such as providing interaction guides via digital information, pop quiz or test on a textbook, providing information via postures, feedbacks expression, multi-medium displaying, singing, storytelling and so on, which is not limited herein. In an embodiment, the electronic device 100 provides audio programs about a behavior audio that include, but not limited to, interactive stories, quizzes, games and songs.

In an embodiment, the electronic device 100 interacts with users by providing behavior audio corresponding to the behavior and the environment.

In an embodiment, as shown in FIG. 1, the electronic device 100 includes a head HD and a body BD. In an embodiment, the head HD is connected to the body BD via a neck NK. In embodiments, the appearance of the electronic device 100 can be varied and is not limited herein.

Please refer to FIG. 2. FIG. 2 is a schematic diagram showing a circuit of an electronic device 100 in an embodiment. In an embodiment, the electronic device 100 further includes an interaction interface 120. The interaction interface 120 is configured on the head HD or on the body BD to provide bidirectional interactions with users. In an embodiment, the interaction interface 120 includes an audio device 121, an image device 122, a light source device 123, a communication device 124, a feature capturing device 125 and wheels WH1 and WH2. The positions of the audio device 121, the image device 122, the light source device 123, the communication device 124, the feature capturing device 125 and the wheels WH1 and WH2 as shown in FIG. 1 are exemplified only for illustration, which is not used for limiting the disclosure. In an embodiment, the devices or units of the interaction interface 120 are disposed at different positions of the head HD or on the body BD according to requirements, respectively.

In an embodiment, as shown in FIG. 2, the electronic device 100 includes a storage 140 and a processor 160. The processor 160 is electrically connected to the storage 140 and the devices or units of the interaction interface 120, respectively. The processor 160 is configured to access behavior setting information and interaction setting information in the storage 140 to control the devices or units of the interaction interface 120 to perform a behavior and an interaction operation.

In an embodiment, the processor 160 is a microcontroller, a microprocessor, a digital signal processor, an application specific integrated circuit (ASIC) or a logic circuit. The storage 140 is a memory, a hard disk, or a portable storage device. In an embodiment, the storage 140 and the processor 160 are disposed inside the electronic device, for example, inside the body BD and inside the head HD. In an embodiment, the storage 140 is configured to store the behavior setting information and the interaction setting information. The processor 160 obtains user information via performing a face recognition, a speech recognition, a dynamic image recognition on an image, or an audio obtained by the feature capturing device 125. In an embodiment, the feature capturing device 125 includes a camera unit for capturing a face image or a dynamic image of the user to allow the processor 160 to perform the subsequent face recognition or the dynamic image recognition. In an embodiment, the feature capturing device 125 includes a record unit for recording voices or environmental sounds for the processor 160 to perform the subsequent speech recognition.

In an embodiment, the processor 160 includes a light source control module 161, a motion module 162, a simultaneous localization and mapping (SLAM) module 163, a direction of arrival (DOA) estimating module 164, a smart home device control module 165, a record module 166, a speech processing module 167, a face recognition module 168, and a gesture recognition module 169.

The above-mentioned functional modules of the processor cooperate with the interaction interface 120 to receive commands and information from the interaction interface 120 or output control commands to the interaction interface 120 for interactions between the user and the electronic device 100. In an embodiment, as shown in FIG. 2, the light source control module 161, the motion module 162, or the smart home device control module 165 outputs the control command to the interaction interface 120. The SLAM module 163, the DOA estimating module 164, the record module 166, the face recognition module 168, or the gesture recognition module 169 of the processor 160 receives the command(s) and information from the interaction interface 120. In an embodiment, the speech processing module 167 includes a dialogue system (DS) or a text to speech system (TTS). The speech processing module 167 receives a command(s) and information from the interaction interface 120 and outputs a control command to the interaction interface 120 bidirectionally. In such a way, the behavior of the electronic device 100 is triggered via the interaction interface 120 to perform the interaction with the electronic device 100. The behavior and the interaction operation performed by the electronic device 100 are described hereinafter.

Figure 3:
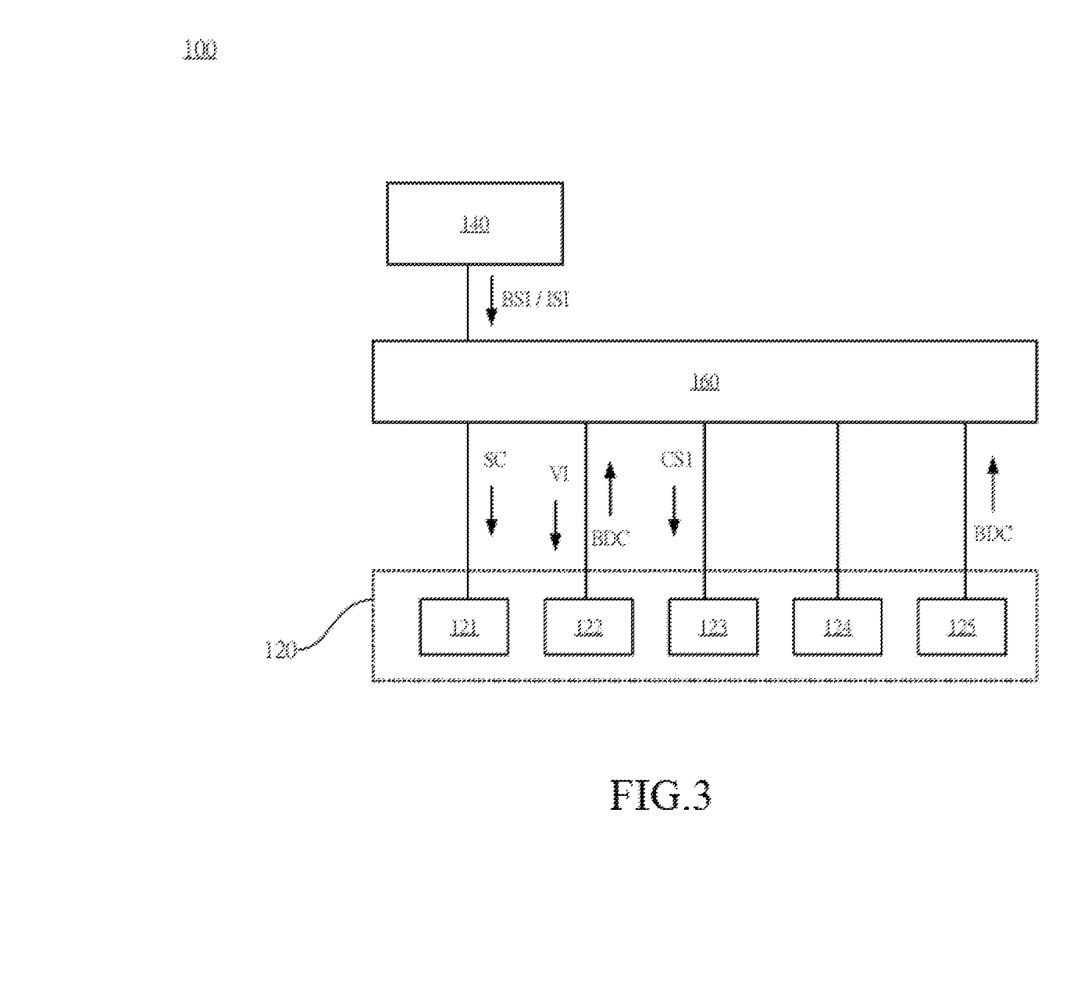
FIG. 3 is a schematic diagram showing an operation of an electronic device in an embodiment.

Please refer to FIG. 3. FIG. 3 is a schematic diagram showing an operation of an electronic device 100 in an embodiment. In an embodiment, the processor 160 receives a behavior-driving command BDC from the interaction interface 120. The processor 160 selects corresponding behavior setting information BSI and interaction setting information ISI according to the behavior-driving command BDC. In an embodiment, the behavior-driving command BDC is a storytelling-driving command. The behavior setting information BSI and the interaction setting information ISI corresponding to the storytelling-driving command is stored in the storage 140. In an embodiment, the behavior-driving command BDC is other behavior-driving commands BDC, such as, a singing or dancing driving command, which is not limited herein.

In an embodiment, the user inputs the behavior-driving command BDC to the electronic device 100 via the feature capturing device 125 or the image device 122 with a touch screen of the interaction interface 120, by means of a voice control, a touch control, buttons and the like. After the electronic device 100 receives the behavior-driving command BDC, the processor 160 is configured to perform a behavior according to the behavior setting information BSI corresponding to the behavior-driving command BDC. The processor is further configured to perform an interaction operation corresponding to the behavior based on the behavior setting information BSI and the interaction setting information ISI to have an interaction with the user when the behavior is performed.

In an embodiment, after the electronic device 100 receives a storytelling-driving command, the processor 160 is configured to perform a storytelling behavior according to the behavior setting information BSI corresponding to the storytelling-driving command. The storytelling behavior performed by the electronic device 100 includes that the processor 160 outputs a behavior audio SC corresponding to a story script via the audio device 121 of the interaction interface 120 according to a behavior script (such as, the story script) in the behavior setting information BSI.

In an embodiment, the interaction operation includes providing an audiovisual information VI corresponding to the behavior via the image device 122 and the audio device 121.

In an embodiment, as shown in FIG. 1, the light source device 123 provides a light source. The interaction operation performed by the processor 160 includes outputting a control signal CS1 by the light source control module 161 to control the light source device 123 to adjust brightness, a color, or a flash rate of the light source of the light source device 123 corresponding to the behavior. Then, various scene atmospheres are provided. In an embodiment, the light source device 123 includes a light-emitting-diode module that is disposed on or around the wheels WH1 and WH2. The interaction setting information ISI includes that the color of the light source is set to be changed to interact with the user when a specific text or word(s) appears in the story script SS.

Figure 4:
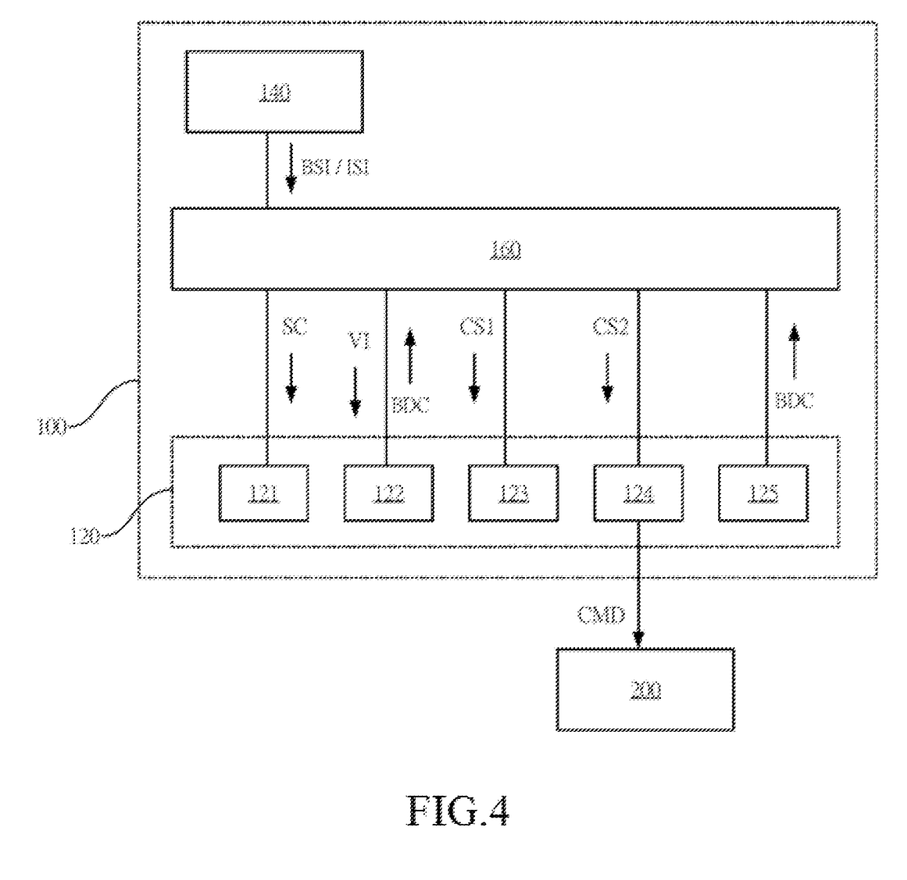
FIG. 4 is a schematic diagram showing an operation of an electronic device in an embodiment.

Please refer to FIG. 4. As shown in FIG. 4, in an embodiment, a control command CMD is outputted to an external smart home device 200 via the communication device 124 of the interaction interface 120. The control command CMD remotely controls the turn on/off or operations of the smart home device 200. In the embodiment, the electronic device 100 controls the smart home device 200 by the smart home device control module 165 of the processor 160. In an embodiment, the smart home device control module 165 outputs a control signal CS2 to the communication device 124. The communication device 124 outputs the corresponding control command CMD to the smart home device 20 when it receives the control signal CS2. In such a way, when the behavior is performed by the electronic device 100, the interaction operation performed by the processor 160 includes outputting the control command CMD to the smart home device 200 via the communication device 124 to control the smart home device 200 to operate corresponding to the behavior. In an embodiment, the control command CMD is a bluetooth signal, an infrared signal, a WIFI signal, or a Zigbee signal, which is not limited herein.

In an embodiment, the smart home device 200 is an indoor lighting device. In an embodiment, in the interaction setting information, the communication device 124 is set to output the control command CMD to reduce the output brightness of the lighting device when the word, such as "night" or "darkness", appears in the story script SS, The scene atmosphere is thus provided. Similarly, when the word, such as "day" and "dawn", appears in the story script SS, the communication device 124 is set to output the control command CMD to improve the output brightness of the lighting device. Then, the ambient light level is improved. It should be understood that the above operations are exemplified only for description, which is not used for limiting the disclosure.

In an embodiment, the smart home device 200 is an air-conditioning device. In the interaction setting information ISI, when the word, such as "winter" or "snow", appears in the story script SS, the communication device 124 is set to output the control command CMD to reduce a setting temperature of the air-conditioning device. Similarly, in the interaction setting information ISI, when the word, such as "summer" or "hotness", appears in the story script SS, the communication device 124 is set to output the control command CMD to raise the setting temperature of the air-conditioning device. Similarly, in an embodiment, the communication device 124 outputs the control command CMD to control various types of the smart home devices, such as a sounder and an audio-visual device. It should be understood that the above embodiment are exemplified only for description, which is not used for limiting the disclosure.

In other words, the electronic device 100 controls various types of the smart home devices 200 via the output of the communication device 124 to provide proper atmosphere and scenes according to the behavior.

In an embodiment, the interaction operation includes making the electronic device 100 move along a moving path based on the behavior audio SC. In an embodiment, when the behavior is performed by the electronic device 100, the processor 160 is configured to make the electronic device 100 move from a living room to a bedroom based according to the storyline represented by the behavior audio SC based on the moving path information in the interaction setting information ISI. In an embodiment, the control of the movement of the electronic device 100 is implemented by the motion module 162 and the simultaneous localization and mapping module 163 of the processor 160. In an embodiment, the moving path information is generated via the simultaneous localization and mapping module 163. The motion module 162 controls to drive the wheels WH1 and WH2. Thus, the speeds and turning directions of the wheels WH1 and WH2 are controlled to rotate or move the electronic device 100.

In an embodiment, when the user provides a voice command to the electronic device 100, the electronic device 100 determines an output of the voice via the DOA estimating module 164 of the processor 160. The electronic device 100 moves or turns according to the output of the voice. In an embodiment, when the user talks to the electronic device 100, the head HD of the electronic device 100 turns to make the image device 122 of the interaction interface 120 faces toward the user. In an embodiment, the electronic device 100 determines the output of the voice via the DOA estimating module 164 to perform the interaction operation, such as, a turning operation, a nod operation, and an operation of shaking the head, corresponding to the behavior of the electronic device 100.

In an embodiment, the interaction setting information ISI stored in the storage 140 further includes the user information. In an embodiment, the user information includes face features, voice features, nicknames, and even the user's age, height, weight and the like of users. The processor 160 is configured to adjust the behavior audio SC according to the user information and output the adjusted behavior audio SC.

In an embodiment, the electronic device 100 is configured to replace role's name in the story script SS with the user's nicknames according to the user information when the behavior audio SC is outputted. In an embodiment, the electronic device 100 is configured to ask different questions with varies difficulties, to use different levels of vocabularies, or to provide different storylines in the story according to the users of different ages. Then user-specific behavior audio SC is provided.

In an embodiment, the electronic device 100 records the user information and stores the user information into a database of the storage 140. In the embodiment, the record unit 166 of the processor 160 obtains the user information via the feature capturing device 125 or the image device 122 with the touch screen.

In an embodiment, the head HD of the electronic device 100 includes a camera unit for capturing images. In an embodiment, the camera unit includes a charge coupled device (CCD) sensor or a complementary metal-oxide semiconductor (CMOS) sensor. In an embodiment, the record unit is a voice receiving unit on the head HD or the body BD of the electronic device 100. A touch screen module is integrated in the image device 122.

In an embodiment, the feature capturing device 125 obtains input data (images or audios) required by the face recognition, the speech recognition or the dynamic image recognition via the camera unit and the record unit. The processor 160 is configured to analyze the input data to get the user information. In the embodiment, the image or the audio obtained by the feature capturing device 125 is processed via the speech processing module 167, the face recognition module 168 or the gesture recognition module 169 of the processor 160 to obtain the user's feature information, such as, the face features, the voice features, or the dynamic figure. The user information formed by the user's personal feature information is recorded by the record unit 166.

In an embodiment, the user information recorded by the record unit 166 includes, but not limited to, the user's personal feature information obtained by the feature capturing device 125. The electronic device 100 is configured to be communicated with the user by means of text-based/voice-based questions and answers. For example, the user answers the questions from the electronic device 100 via an input interface of the touch screen module. Or the user has a voice conversation with the electronic device 100. In such a way, the electronic device 100 obtains the user's personal information including the nickname, the height or the weight. In the embodiment, when the user information is obtained via the text-based/voice-based questions and answers, the speech processing unit 167 of the processor 160 is configured to get the user information (such as, the voice features), and the record unit 166 of the processor 160 is configures to record the user's answers as the user information. The dialogue system and the text to speech system of the speech processing unit 167 can be implemented in different ways, which is not described herein.

In an embodiment, the interaction setting information ISI stored in the storage 140 further includes interaction information. The image or the audio obtained from the camera unit or the record unit of the feature capturing device 125 is analyzed by the processor 160 to generate the interaction information. The interaction with the user is performed according to the interaction information. In an embodiment, the electronic device 100 asks the user questions via the screen or voice, and analyzes the image or the audio obtained from the camera unit or the record unit via the processor 160 to confirm the user's motion or answer.

In an embodiment, when the electronic device tells a story and asks the user whether to allow a lead role to go into a forest. The user responses vocally "yes" or "no". Or the user responses via motions, such as, nodding, shaking his head, or waving his hand and so on. The image or the audio is captured by the feature capturing device 125 and then sent to the processor 160. The processor 160 is configured to process and analyze the image, or the audio received from the feature capturing device 125 via the corresponding functional modules, such as, the speech processing unit 167, the face recognition module 168 or the gesture recognition module 169, to generate the interaction information. The processor 160 is configured to adjust the behavior audio SC according to the interaction information. In an embodiment, in the interaction setting information ISI, different storylines in the story script SS are set to be triggered according to the user's response (for example, allowing/not allowing the lead role to go into the forest) to change the development or the ending of the story. In such a way, with the same story, the electronic device 100 provides different experiences or different selections for different users.

In sum, the interaction setting information ISI stored in the storage 140 includes the interaction information about how the electronic device 100 perform the interaction with the user to corresponding to the different story scenes or storylines appears. When the storytelling behavior is performed by the processor 160, the corresponding interaction operation is performed via the interaction interface according to the interaction information and contents of the story script SS, to provide the users with various experiences.

In an embodiment, the behavior script includes a study script which is applied in education. Similarly, the electronic device 100 is communicated with the user by asking and answering questions. The electronic device 100 performs the interaction with the user according to whether the user's answer is right or not, which improves an interactive learning effect. Therefore, in embodiments, the behavior script is changed to have different applications. It should be understood that the above mention is exemplified only for description, which is not used for limiting the disclosure.

Figure 5:
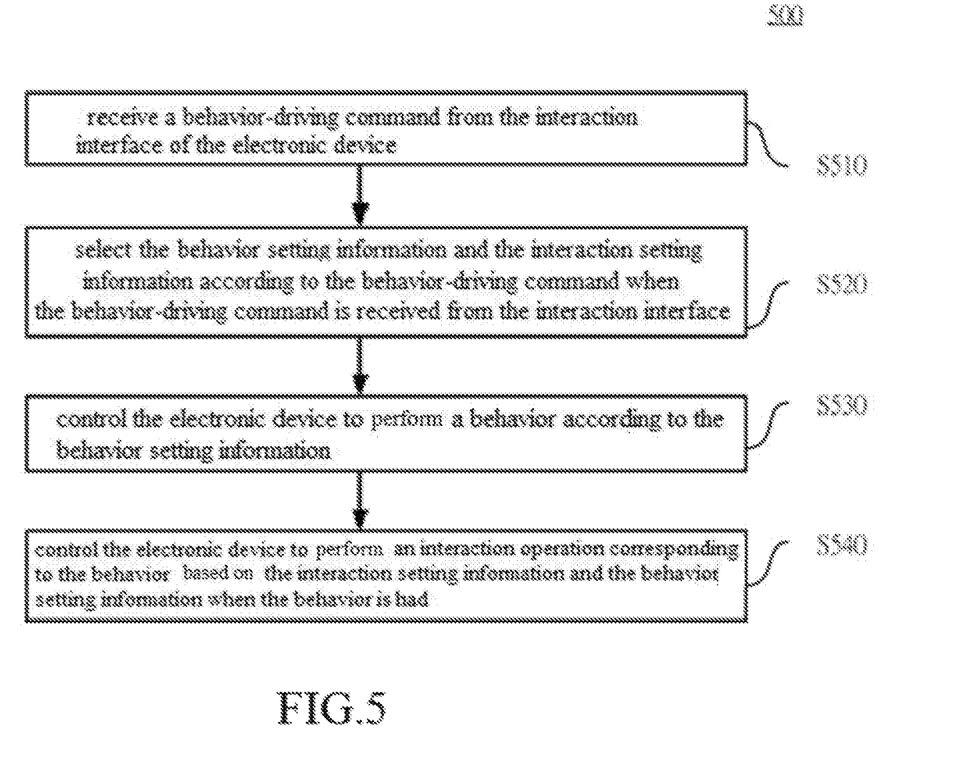
FIG. 5 is a flow chart of a control method of an electronic device in an embodiment.

Please refer to FIG. 5. FIG. 5 is a flow chart of a control method 500 of an electronic device 100 in an embodiment. In an embodiment, a control method 500 is implemented by using a non-transitory computer readable storage medium. At least a program command is recorded in the non-transitory computer readable storage medium. After the program command is loaded by the electronic device, following steps are had. For better understanding, the control method 500 is described in combination with the embodiments of FIG. 1 to FIG. 4, which is not limited herein. Persons having ordinary skill in the art may make various modifications and changes without departing from the scope of the disclosure. As shown in FIG. 5, in an embodiment, the control method 500 includes steps S510, S520, S530 and S540.

In step S510, the processor 160 receives a behavior-driving command BDC from the interaction interface 120 of the electronic device 100. In an embodiment, the behavior-driving command is a storytelling-driving command. In an embodiment, the behavior-driving command is other behavior-driving commands, such as, a singing or dancing driving command, which is not limited herein.

In step S520, when the processor 160 receives the behavior-driving command BDC from the interaction interface 120, the corresponding behavior setting information BSI and the interaction setting information ISI is selected according to the behavior-driving command BDC.

In step S530, the processor 160 controls the electronic device 100 to perform a behavior according to the behavior setting information BSI. In an embodiment, the behavior performed by the electronic device 100 is that outputting a corresponding behavior audio SC via the audio device 121 of the interaction interface 120 according to the behavior setting information BSI.

In step S540, when the behavior is performed, the processor 160 controls the electronic device 100 to perform an interaction operation corresponding to the behavior based on the interaction setting information ISI and the behavior setting information BSI.

In an embodiment, the interaction operation includes providing audiovisual information corresponding to the behavior via the image device 122 and the audio device 121 of the interaction interface 120.

In an embodiment, the interaction operation includes adjusting the brightness, the color, or the flash rate of the outputted light source of the light source device 123 in the electronic device 100.

In an embodiment, the interaction operation includes outputting the control command CMD to the smart home device 200 via the communication device 124 to trigger the operation of the smart home device 200 corresponding to the behavior.

In an embodiment, the interaction operation includes making the electronic device 100 move along a moving path based on the behavior audio.

In an embodiment, the interaction setting information ISI includes the user information and the interaction information. The way of obtaining and recording the user information and the interaction information is described above, which is omitted herein.

In an embodiment, the processor 160 is configured to adjust the behavior audio SC according to the user information and output the adjusted behavior audio SC.

In an embodiment, the processor 160 is configured to adjust the outputted behavior audio SC according to the interaction information.

Persons having ordinary skill in the art understand how the control method 500 is implemented by the electronic device 100 in multiple different embodiments to perform the above steps and operations, details for which is not described herein.

In sum, when the behavior is had by the electronic device, the processor controls the electronic device to perform the interaction operation corresponding to the behavior according to various types of the interaction setting information and the behavior setting information to perform the interaction with the user, other electronic devices, or the ambient environment. Thus, the representations of the storytelling and the teaching are diversified, which enhance the interest and improve the learning effect.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An electronic device comprising:
    a storage for storing interaction setting information and behavior setting information;
    an interaction interface; and
    a processor electrically connected to the storage and the interaction interface, when the processor receives a behavior-driving command from the interaction interface, the processor is configured to select the behavior setting information and the interaction setting information according to the behavior-driving command,
    wherein the processor is configured to perform a behavior according to the behavior setting information, and to perform an interaction operation corresponding to the behavior based on the behavior setting information and the interaction setting information, and
    wherein the electronic device comprises a light source device;
        the behavior-driving command comprises a storytelling-driving command, the behavior comprises a storytelling behavior and the processor performs the storytelling behavior corresponding to the storytelling-driving command when the processor receives the storytelling-driving command; and
        the processor outputs a control signal to adjust the light source device according to the storytelling behavior.

2. The electronic device according to claim 1, wherein the electronic device further includes an audio device, and a communication device which communicates with an external smart home device, wherein the behavior includes outputting a behavior audio via the audio device.

3. The electronic device according to claim 2, wherein the interaction operation includes making the electronic device move along a moving path based on the behavior audio.

4. The electronic device according to claim 2, wherein the processor includes a record unit for recording user information as the interaction setting information, and the processor is configured to adjust the outputted behavior audio according to the user information.

5. The electronic device according to claim 4, wherein the record unit obtains the user information via a dialogue system or a text to speech system in a speech processing unit.

6. The electronic device according to claim 4, wherein the electronic device further includes a feature capturing device, and the processor obtains the user information via performing a face recognition, a speech recognition, or a dynamic image recognition on input data obtained by the feature capturing device.

7. The electronic device according to claim 2, wherein the electronic device further includes a feature capturing device, and the processor generates interaction information via analyzing an image or an audio obtained by the feature capturing device and adjusts the behavior audio according to the interaction information.

8. The electronic device according to claim 2, wherein the processor outputs the behavior audio corresponding to a story script via the audio device, the story script being included in the behavior setting information stored in the storage.

9. The electronic device according to claim 2, wherein the processor outputs a control command to the external smart home device via the communication device to control the external smart home device to operate corresponding to the storytelling behavior, wherein the external smart home device is a lighting device, and the control command reduces or increases an output brightness of the lighting device according to words appearing in the story script.

10. The electronic device according to claim 1, wherein the electronic device further includes an image device, and the interaction operation includes providing audiovisual information corresponding to the behavior via the image device and the audio device.

11. The electronic device according to claim 1, wherein the processor outputs the control signal to control the light source device to adjust brightness, a color, or a flash rate of the light source device.

12. The electronic device according to claim 1, wherein the behavior setting information includes a behavior script corresponding to the behavior.

13. An electronic device comprising:
    a storage for storing interaction setting information and behavior setting information; and
    a processor electrically connected to the storage and an interaction interface, when the processor receives a behavior-driving command from the interaction interface, the processor is configured to select the behavior setting information and the interaction setting information according to the behavior-driving command,
    wherein the processor performs
    a behavior according to the behavior setting information, and performs
    an interaction operation corresponding to the behavior based on the interaction setting information and the behavior setting information when the behavior is performed, and
    wherein the electronic device comprises a communication device which communicates with an external smart home device;
        the behavior-driving command comprises a storytelling-driving command and the behavior comprises a storytelling behavior, and the processor performs the storytelling behavior corresponding to the storytelling-driving command when the electronic device receives the storytelling-driving command; and
        the processor outputs a control command to the external smart home device via the communication device to control the external smart home device to operate corresponding to the storytelling behavior, when the external smart home device is a lighting device, the communication device outputs the control command to adjust the lighting device according to words appearing in a story script corresponding to the storytelling behavior.

14. The electronic device according to claim 13, wherein the processor performs the behavior according to the behavior setting information further includes to control an audio device to output
a behavior audio according to the behavior setting information.

15. The electronic device according to claim 14 wherein the processor performs interaction operation further includes to make
the electronic device move along a moving path based on the behavior audio.

16. The electronic device according to claim 14, wherein the interaction setting information includes user information, and the interaction operation includes adjusting the behavior audio according to the user information.

17. The electronic device according to claim 13, wherein the processor performs the interaction operation further includes to control an image device to
provide audiovisual information corresponding to the behavior.

18. The electronic device according to claim 13, wherein the electronic device further comprises an audio device and a light source device.

19. The electronic device according to claim 18, wherein the processor outputs a behavior audio corresponding to the story script via the audio device, the story script being included in the behavior setting information stored in the storage.

20. The electronic device according to claim 18, wherein the processor outputs a control signal to control the light source device to adjust a brightness, a color, or a flash rate of the light source device according to the storytelling behavior.

21. The electronic device according to claim 18, wherein the interaction setting information comprises information to effect the color of the light source device being changed to interact with the user when a specific text or word appears in the story script.

22. An electronic device comprising:
a storage for storing interaction setting information and behavior setting information; and
a processor electrically connected to the storage and an interaction interface, when the processor receives a behavior-driving command from the interaction interface, the processor is configured to select the behavior setting information and the interaction setting information according to the behavior-driving command, wherein the processor performs
a behavior according to the behavior setting information, and performs
an interaction operation corresponding to the behavior based on the interaction setting information and the behavior setting information when the behavior is performed,
wherein the electronic device comprises a communication device which communicates with an external smart home device;
the behavior-driving command comprises a storytelling-driving command and the behavior comprises a storytelling behavior, and the processor performs the storytelling behavior corresponding to the storytelling-driving command when the electronic device receives the storytelling-driving command; and;
the processor outputs a control command to the external smart home device via the communication device to control the external smart home device to operate corresponding to the storytelling behavior, when the external smart home device is an air-conditioning device, and the communication device outputs the control command to adjust a setting temperature of the air-conditioning device according to words appearing in a story script corresponding to the storytelling behavior.

* * * * *